United States Patent
Jaenicke

(10) Patent No.: US 6,646,401 B2
(45) Date of Patent: Nov. 11, 2003

(54) METHOD AND APPARATUS FOR AUTOMATIC ALLOCATION OF A MOTOR SENSOR TO A POWER SECTION WITHIN AN ELECTRICAL DRIVE SYSTEM

(75) Inventor: Peter Jaenicke, Erlangen (DE)

(73) Assignee: Siemens Aktiengesellschaft (DE)

( * ) Notice: Subject to any disclaimer, the term of this patent is extended or adjusted under 35 U.S.C. 154(b) by 77 days.

(21) Appl. No.: 10/056,852

(22) Filed: Nov. 13, 2001

(65) Prior Publication Data

US 2002/0109423 A1 Aug. 15, 2002

(30) Foreign Application Priority Data

Nov. 13, 2000 (DE) .......................................... 100 56 146

(51) Int. Cl.$^7$ ............................................... G05B 23/02
(52) U.S. Cl. ........................ 318/490; 324/522; 324/523
(58) Field of Search ................................. 318/138, 254, 318/439, 490, 565, 721; 324/500, 508, 511, 512, 522, 523, 525, 527, 772, 538, 543, 600, 649, 691

(56) References Cited

U.S. PATENT DOCUMENTS

| | | | | |
|---|---|---|---|---|
| 4,839,575 A | * | 6/1989 | MacFarlane | |
| 5,872,435 A | * | 2/1999 | Bolte et al. | 318/254 |
| 6,075,688 A | * | 6/2000 | Willard et al. | 361/92 |
| 6,343,498 B1 | * | 2/2002 | Oba et al. | 73/1.57 |
| 6,392,854 B1 | * | 5/2002 | O'Gorman | 361/31 |

* cited by examiner

Primary Examiner—Bentsu Ro
(74) Attorney, Agent, or Firm—Baker Botts LLP

(57) ABSTRACT

In a control loop comprising a motor, a power section, a motor sensor and a control unit, an electrical circuit is also closed by producing an electrical connection between the motor and the motor sensor. Safe electrical isolation in such a control loop is preferably overcome by means of parasitic capacitances. The control unit transmits a feature, preferably via the power section, which feature is passed to the control unit once again from the other direction. This feature need not be an identity in the sense of a number, and a pulse which can be identified uniquely is sufficient. This allows a technically very effective implementation of a comparison of the control loop structure with the actual wiring, by the control unit evaluating the motor sensor to determine whether the pulse has occurred.

14 Claims, 4 Drawing Sheets

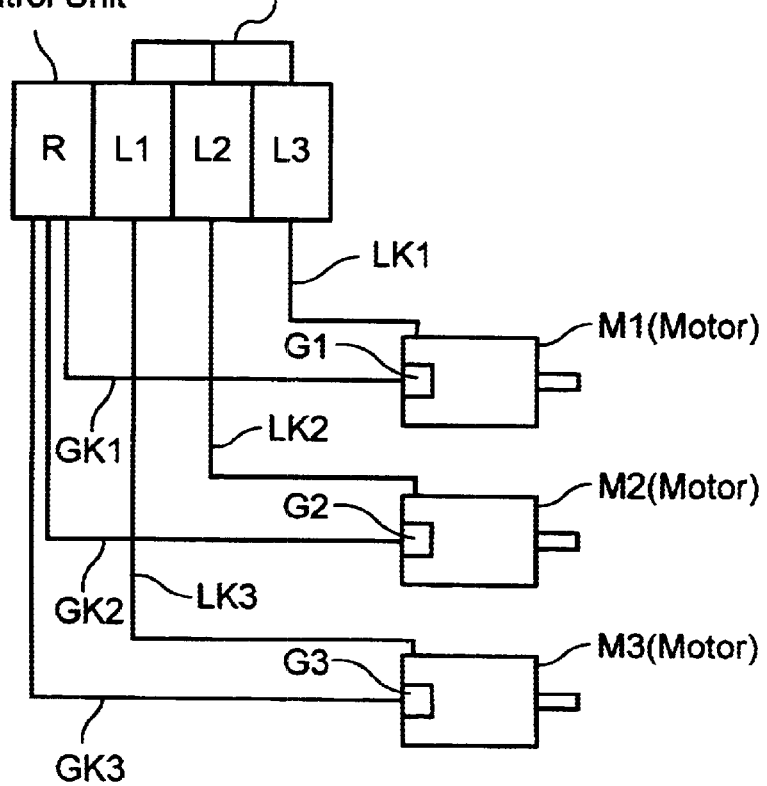
F I G. 6

METHOD AND APPARATUS FOR AUTOMATIC ALLOCATION OF A MOTOR SENSOR TO A POWER SECTION WITHIN AN ELECTRICAL DRIVE SYSTEM

FIELD OF THE INVENTION

The invention relates to a method for automatic allocation of a motor sensor to a power section in an electrical drive system; and also to an electrical drive system which utilizes the aforesaid method.

BACKGROUND OF THE INVENTION

In industrial automation machines having electrical drives, and particularly where a number of electrical drives are combined, such as in numerically controlled machine tools and robots, one problem which arises frequently is the proper allocation of motor sensors connected to the power section. This is particularly so where a number of electrical drives have associated sensor systems, because there is a considerable risk of an incorrect association of a sensor to the power section due to a false connection, etc. Faulty connections can result in hazards, for example for the operator of a robot.

FIG. 5 shows a conventional drive system with three motors M1 to M3, which are fed via respective power cables LK1 to LK3 from respectively associated power sections L1 to L3. Each motor M1, M2, M3 has an associated motor sensor G1, G2 and G3, which is connected via a respective sensor cable GK1 to GK3 to the associated power section L1 to L3. This results in the formation of a control loop for controlling each motor M1 to M3. Thus, normally, in addition to the power connection LK1 to LK3, a power section L1 to L3 also has a connection GK1 to GK3 for the motor sensor G1 to G3. Each motor sensor G1 to G3 must be connected correctly to the associated sensor interface GK1 to GK3, and no other association is possible for technically correct operation. If, for example in the case of two shafts, the motor sensor connections GK1, GK2, GK3 are interchanged, this fault cannot be detected without activating the motors M1 to M3 which can result in a considerable hazard potential for an operator of such a machine.

SUMMARY OF THE INVENTION

The object of the present invention is to provide a capability for automatic allocation between a power section and the motor sensor connected to this power section by which even flexible connection variants such as those shown in FIG. 6 and FIG. 7 are possible. The arrangement in FIGS. 6 and 7 have the basic design shown in FIG. 5. However, FIG. 6 incorporates a central control unit R, for the evaluation of all the motor sensors G1 to G3 which drive all three power sections L1 to L3. Accordingly, all the sensor interfaces GK1 to GK3 are also connected to the control unit R.

FIG. 7 shows the cascading of motor sensors MG1 to MG3. In this case, the control unit R as shown in FIG. 6 is again provided, but without dedicated sensor cables GK1 to GK3 routed separately from each motor sensor MG1 to MG3 to the control unit R. Instead, and a communication interface is provided. The motor sensors G1 to G3 are networked to one another via this communication interface, for example using line topology, via a bus system or by point-to-point links. Only the first motor sensor G1 in the line is connected to the control unit R. Further, motor sensors G2, G3 are connected by means of a serial link to the respectively preceding motor sensor, i.e., G2 to G1, and G3 to G2, etc., in a cascade.

Conventionally, the process of allocating a power section and the associated motor sensor can be carried out only via a configuration process for these elements. This however, involves an additional action by the person setting up the system as shown in FIG. 5. Furthermore, errors can occur during the allocation process which are not readily apparent.

Also, new sensor interfaces are increasingly being introduced with modem drive systems, which allow the configurations shown in FIGS. 6 and 7. Accordingly, the present invention also has as an objective to provide a simple procedure for setting-up such configurations.

The present invention, achieves the aforesaid objective by a method for automatic allocation of a motor sensor to a power section within an electrical drive system. Specifically, a closed loop is formed from a control unit, the power section, a motor and the motor sensor. The control unit transmits a preset feature signature via the power section, which feature is passed back again to the control unit via the closed loop. The control unit compares a control loop structure with the actual wiring of the motor sensor and power section.

It has been found to be particularly advantageous if a pulse, in particular a preset voltage pulse, which can be uniquely identified is provided as the feature. Nevertheless, as an alternative, a unique characteristic value can also be preset. The method according to the present invention is particularly effective where an identical pulse or signature feature is emitted simultaneously via the power section on all the phases of the motor. This provides a very effective comparison of the control loop structure with the actual wiring, with the control unit evaluating the motor sensor to determine whether the pulse has occurred.

Alternatively, the object of the present invention can also be achieved by a method for automatic allocation of a motor sensor to a power section within an electrical drive system, wherein a closed loop is formed from a control unit, the power section, a motor and the motor sensor. The control unit transmits the feature via the motor sensor, which feature is passed back again to the control unit via the closed loop, and the control unit compares the control loop structure with the actual wiring. In this case, it has also been found to be particularly advantageous for a pulse, in particular a voltage pulse which can be uniquely identified, to be preset as the transmitted feature. However, a unique characteristic value can also be used as the preset feature. The aforesaid communication direction enables a simple technical transmission via an existing power line to be used as an alternative to costly additional lines, provided that the motor and the power section are connected via a power line onto which the feature may be, or is modulated for transmission.

Frequently, safe electrical isolation in a drive system is required for compliance with safety directives and standards. While this makes it more difficult to produce a closed loop between the components described above, couplings by means of parasitic capacitances may be used to satisfy the safe electrical isolation requirements within the closed loop.

While the aforesaid communication direction is from the power section to the motor, it has been found to be advantageous to use a temperature sensor to effect the safe electrical isolation between the motor and the motor sensor. The temperature sensor is arranged in the motor winding and is evaluated by the control unit via the motor sensor for coupling of a pulse caused by a parasitic capacitance.

In the case of communication in the opposite direction, a temperature sensor can also be used to effect safe electrical isolation between the motor and the motor sensor. Here, the temperature sensor is arranged in the motor winding and the temperature sensor is evaluated by the control unit via the coupled motor and the power section, with a pulse caused by a parasitic capacitance.

Alternatively, the problem of safe electrical isolation can be accomplished if the motor is connected via a power line to the power section, with the motor sensor being supplied with voltage via the power section. The lines for supplying voltage to the motor sensor are also arranged in the power line. Couplings by means of parasitic capacitances are used between the lines for supplying voltage to the motor and the lines for supplying voltage to the motor sensor within the power line to overcome safe electrical isolation between the motor and the motor sensor.

The object of the present invention, as described above, is also achieved by an electrical drive system, having a motor, a power section, a control unit and a motor sensor, which are connected to one another such that they form a closed loop, in which a feature is transmitted by the control unit. This feature can be transmitted in one direction of the closed loop and can be detected from the other direction so that a control loop structure of the drive system can be compared with the actual wiring. Significant advantages can be achieved by this arrangement of a drive system when operated using the method according to the invention described above.

BRIEF DESCRIPTION OF THE DRAWINGS

Further advantages and details relating to the present invention are provided in the following disclosure of exemplary embodiments in conjunction with the drawings, which schematically illustrate the invention. Elements with the same function are identified by the same reference symbols, for the sake of clarity, accordingly:

FIG. 6 shows a block diagram of a drive system with three motors and central sensor evaluation;

DETAILED DESCRIPTION OF THE INVENTION

Figure 1:
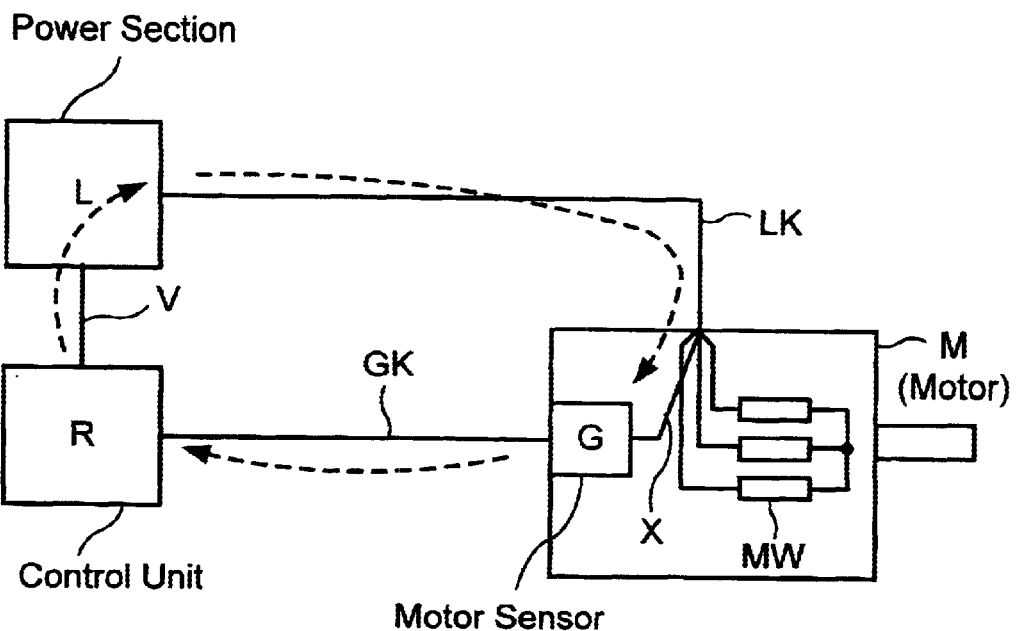
FIG. 1 shows a block diagram of a drive system with automatic allocation of a motor sensor to a power section according to the invention.

FIG. 1 shows an exemplary embodiment of a drive system with automatic allocation of a motor sensor to a power section according to the invention. By way of example, the block diagram illustrates a detail of the drive system shown in FIG. 6, with the control loop structure of a motor M being shown, together with the associated power section L and the motor sensor G as well as the central control unit R.

The control unit R is connected via an interface V to the power section L, which is connected via a power cable LK to the motor M, which has a three-phase motor winding MW. The motor sensor G is fitted to the motor M, in order to detect acceleration and/or rotation speed and/or position values, which are supplied via a sensor cable GK to the control unit R.

According to the present invention, an electrical circuit is also now closed in this control loop, by creating an electrical connection X between the motor M and the motor sensor G. Options resulting from this will be explained below. The problem here is that, generally, safe electrical isolation is provided in such a control loop in particular between the motor M and a motor sensor G in order to comply with the safety requirements and standards.

According to the present invention, the control unit R transmits a feature via the power section L, which arrives back at the control unit R via the chain comprising the power line LK, the motor M, the motor sensor G and the sensor cable GK. As such, the loop is closed. This feature need not have any identification in the sense of a number. A pulse which can be uniquely identified is sufficient. The fact that a transmitted pulse can be detected by the control unit R again ensures that the control loop structure matches the actual wiring of the components. If this is not the case, it is possible to prevent the motor M from being activated.

The foregoing procedure results in a number of advantages, namely:

No additional assemblies are required in the motor;
The power section can be used to emit the feature (see the following embodiment); and
The present invention can be achieved without any modification to the motors or power sections.

In principle, the intelligence for emitting and detecting of the feature need not be arranged in the separate control unit R, although it is advantageous to us a microprocessor or microcontroller for this purpose which is arranged in the control unit R. If other components in the closed loop have intelligence in them, then these elements likewise may be used as control units for the purposes of this invention. This applies particularly where a part of the control unit has been moved to in the power sections. In this case, the intelligence in the power section can also carry out the function of the invention, and functions as the control unit R.

Figure 2:
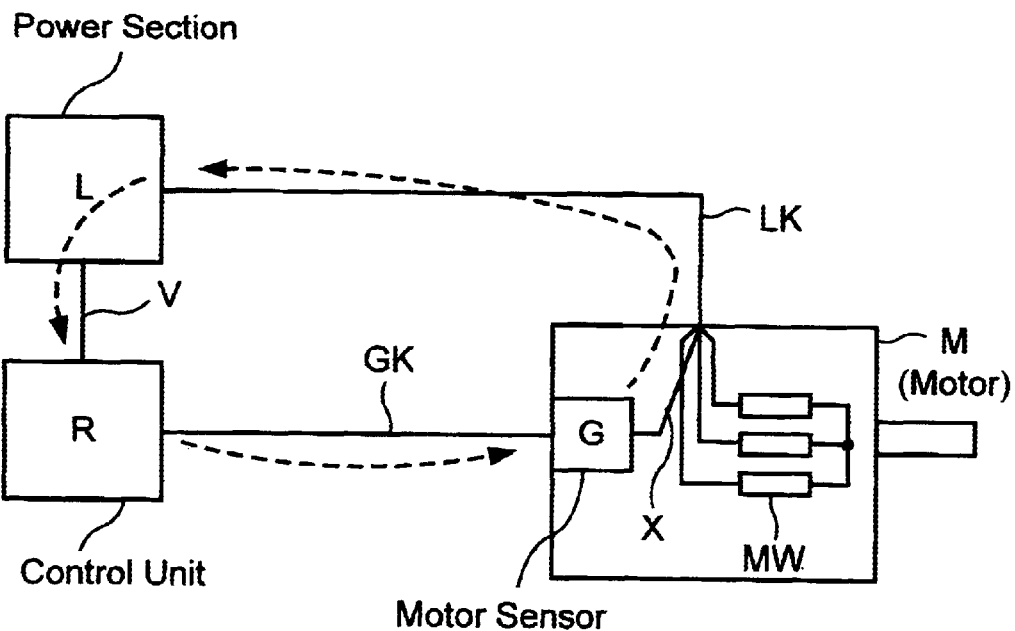
FIG. 2 shows a block diagram of an alternative drive system with automatic allocation of a motor sensor to a power section, with the opposite communication direction.

An alternative arrangement is shown in FIG. 2, which generally corresponds to FIG. 1. However, the automatic allocation of the power section L and motor sensor G is carried out by the control unit transmitting a feature via the sensor cable GK. The transmitted feature arrives back at the control unit R via the chain comprising the motor sensor G, the motor M, the power line LK and the power section L. The loop is closed in this way, but the communication direction for transmitting the feature is reversed. Only one pulse need be transmitted in this case. Likewise, however, a unique characteristic value can also be transmitted in the form of a numerical combination etc., although this increases the complexity, since digital transmission will generally be required.

In comparison to the embodiment shown in FIG. 1, this embodiment has a slight disadvantage in that either an additional line is required between the motor M and the power section L for transmitting the feature, or else transmission is necessary via the power cable LK in the opposite direction to the normal transmission direction for supplying the voltage to the motor M. While this can be achieved, it involves greater technical complexity, for example by modulation of the feature, such as a voltage pulse, onto the power line, and appropriate evaluation of the power section L.

Accordingly, while the embodiment shown in FIG. 2 has the advantage that no additional assembly is required in the motor, it requires modulating the signals onto the power line, or additional lines, and further a receiver is required in the power section.

Figure 3:
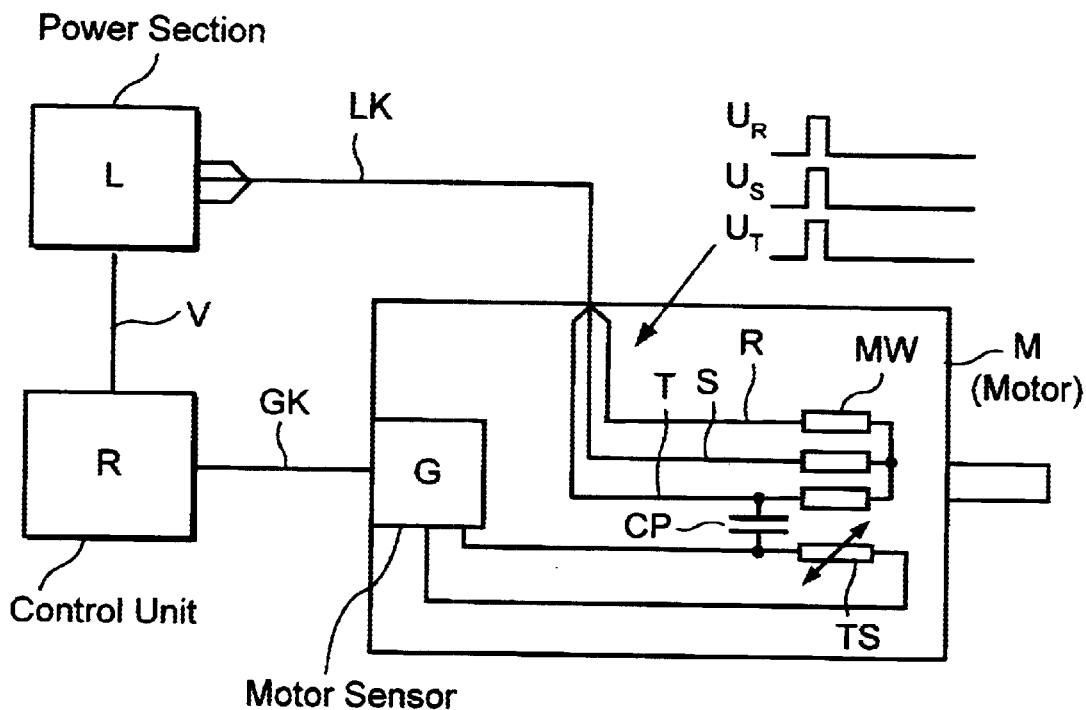
FIG. 3 shows a block diagram of an implementation of the present invention with coupling via a temperature sensor.
Figure 4:
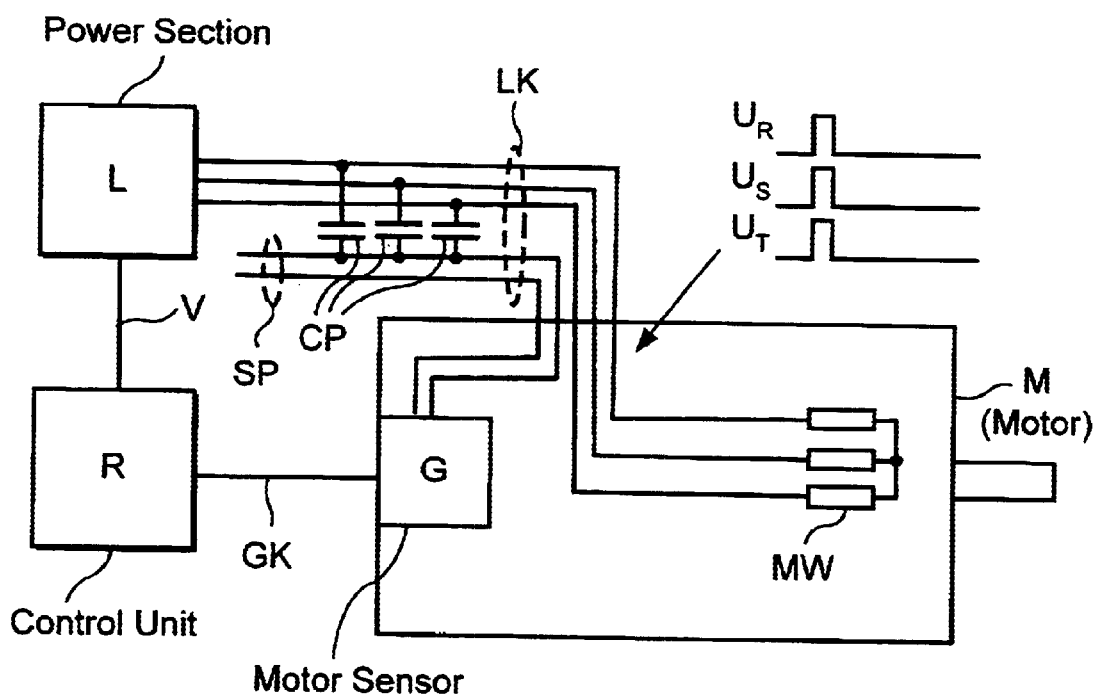
FIG. 4 shows a block diagram of an implementation of the present invention with coupling via the voltage supply.
Figure 5:
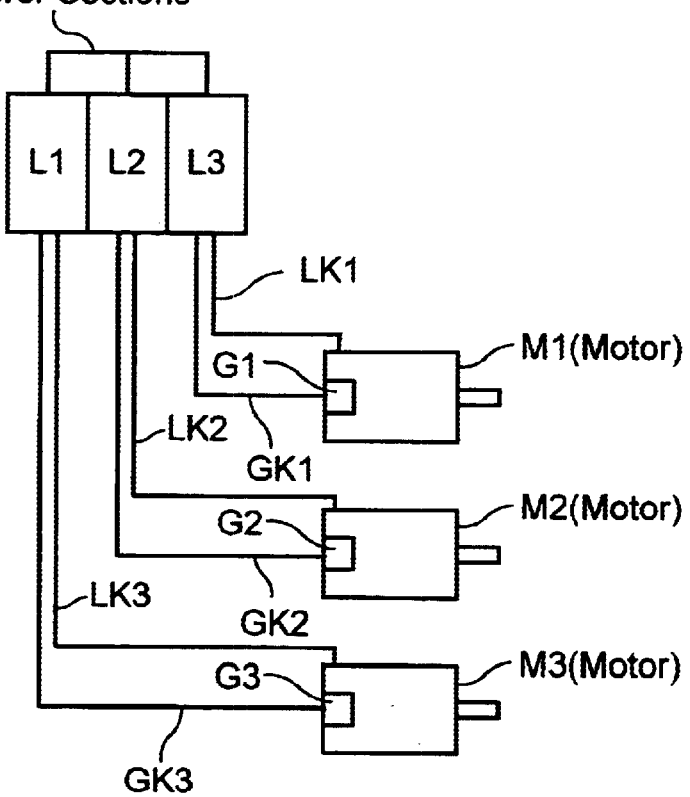
FIG. 5 shows a block diagram of a conventional drive system with three motors.
Figure 7:
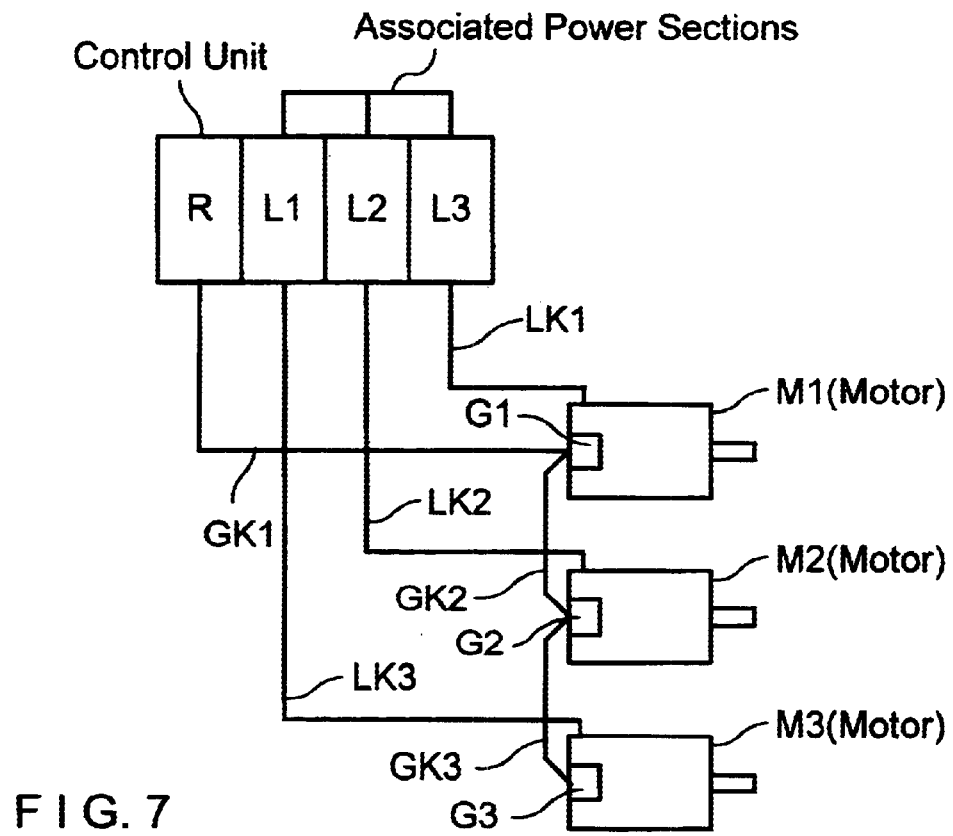
FIG. 7 shows a block diagram of a drive system with three motors and a sensor bus system.

Thus, the embodiment shown in FIG. 1 is understood to provide the simplest approach. The critical factor is the automatic allocation of the power section L and the motor sensor G. Two approaches for this are particularly promising, and these are shown in FIGS. 3 and 4. Both Figures have the same basic structure as the arrangements shown in FIGS. 1 and 2.

In both FIGS. 3 and 4, the control unit R uses the existing power section L for emitting a pulse UR, US, UT on all three motor phases R, S and T. Such a pulse does not result in any current flowing through the motor M. Parasitic capacitances CP result in couplings on other lines which can be evaluated by the motor sensor G. This overcomes the problems mentioned above relating to safe electrical isolation in the motor M. The control unit R can read the motor sensor G to determine whether the pulse UR, US, UT has occurred. The correct association is thus known.

FIG. 3 shows an embodiment of the invention which uses coupling to a temperature sensor TS in the motor winding MW. The temperature sensor TS is intended to be evaluated in the drive system on the motor sensor G. The motor sensor G thus has additional hardware to identify coupling. The temperature sensor TS is itself not generally electrically isolated. It is also possible to utilize this embodiment when existing motors and motor sensors are used. The only precondition is that the lines to the temperature sensor TS are routed in the sensor cable GK. In this case, sensor evaluation can identify the pulse UR, US, UT.

FIG. 4 shows another embodiment. In this case, the coupling to an additional line SP in the power cable LK is used. The additional line SP is preferably used for supplying voltage to the motor sensor G. In this case as well, the only hardware required on the part of the motor sensor G is that to identify the pulse of the feature. Furthermore, there is no problem with safe electrical isolation in the motor M.

In the preferred embodiment shown in FIG. 1, and the corresponding embodiments discussed above in connection with FIGS. 3 and 4, the following are particularly advantageous aspects:

Use of the existing power section to emit a "three-phase pulse"; and

Use of parasitic capacitances for overcoming "safe electrical isolation"

Figure 8:
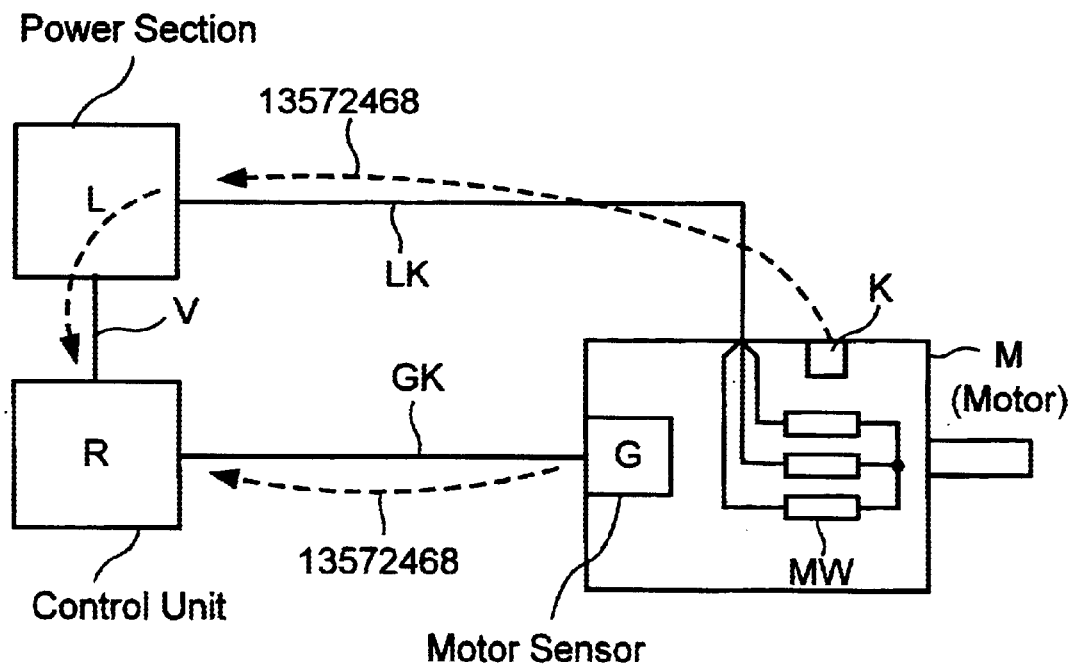
FIG. 8 shows a block diagram of an alternative drive system with automatic allocation of a motor sensor to a power section, without any electrical connection between the motor and motor sensor.

In situations where it is impossible to produce an electrical connection X between the motor M and the motor sensor G, and no optical or other signal connection can be produced, an alternative embodiment of the present invention is shown in FIG. 8. This embodiment largely corresponds to that shown in FIG. 1 and FIG. 2, however connection X is missing. Here, a (worldwide) unique identification is provided both in the motor sensor G and in the motor M, i.e., the value "13572468". The motor M also has its own identification assembly K. When the motor M is switched on the identification is transmitted via the power cable LK to the power section L, and from the motor sensor G via the sensor cable GK. The control unit R determines the association by reading the identification from the power section L.

While this embodiment has the advantage that the motor sensor does not need to have any connection to the power line, there are certain disadvantages; namely:

An additional identification assembly is required in the motor;

Signals must be modulated onto the power line, or additional lines are required, and furthermore a receiver is required in the power section; and During production, consistent identifications must be stored in the motor sensor and in the identification assembly of the motor.

I claim:

1. A method for an automatic allocation of a motor sensor to a power section in wiring for an electrical drive system which has a closed loop formed from a control unit, the power section, a motor and the motor sensor, the method comprising transmitting a feature from the control unit via the power section, causing the feature to be passed back to the control unit via the closed loop, and comparing in the control unit a control loop structure with the wiring.

2. The method according to claim 1, wherein the feature is a preset pulse, which can be uniquely identified.

3. The method according to claim 1, wherein the feature is a preset unique characteristic value.

4. The method according to claim 1, further comprising simultaneously transmitting an identical feature via the power section on all phases of the motor.

5. The method according to claim 4, wherein the feature is a pulse and the control loop structure is compared in the control unit with the wiring by evaluating the motor sensor to determine whether the pulse has occurred.

6. The method according to claim 1, having couplings by means of parasitic capacitances to overcome safe electrical isolation within the closed loop.

7. The method according to claim 6, using a temperature sensor to overcome safe electrical isolation between the motor sensor and the motor, wherein the temperature sensor is arranged in the motor winding and is evaluated by the control unit via the motor sensor for coupling of a pulse caused by a parasitic capacitance.

8. The method according to claim 6, wherein the motor is connected via a power line to the power section, further comprising supplying the motor sensor with voltage via the power section, and wherein the lines for supplying voltage to the motor sensor are arranged in the power line, and having couplings by means of parasitic capacitances between the lines for supplying voltage to the motor and the lines for supplying voltage to the motor sensor within the power line to overcome safe electrical isolation between the motor sensor and the motor.

9. A method for an automatic allocation of a motor sensor to a power section in wiring for an electrical drive system which has a closed loop formed from a control unit, the power section, a motor and the motor sensor, the method comprising transmitting a feature from the control unit via the motor sensor, causing the feature to be passed back to the control unit via the closed loop and comparing in the control unit a control loop structure with the wiring.

10. The method according to claim 9, wherein the feature is a preset pulse which can be uniquely identified.

11. The method according to claim 9, wherein the feature is a preset unique characteristic value.

12. The method according to claim 9, wherein the motor and the power section are connected via a power line onto which the feature is modulated for transmission.

13. The method according to claim 9, using a temperature sensor to overcome safe electrical isolation between the motor sensor, and the motor, wherein the temperature sensor is arranged in the motor winding and is evaluated by the control unit via the motor and the power section for coupling of a pulse caused by a parasitic capacitance.

14. An electrical drive system comprising a motor, a power section, a control unit and a motor sensor connected by wiring to form a closed loop, wherein a feature is transmitted by the control unit in one direction of the closed loop and can be detected from another direction, whereby a control loop structure of the drive system can be compared with the wiring.

* * * * *